(12) United States Patent
Mizrachi et al.

(10) Patent No.: US 8,255,567 B2
(45) Date of Patent: Aug. 28, 2012

(54) EFFICIENT IP DATAGRAM REASSEMBLY

(75) Inventors: Shay Mizrachi, Hod-Hasharon (IL); Rafi Shalom, Ramat Gan (IL); Ron Grinfeld, Ramat Gan (IL)

(73) Assignee: Broadcom Corporation, Irvine, CA (US)

( * ) Notice: Subject to any disclaimer, the term of this patent is extended or adjusted under 35 U.S.C. 154(b) by 1908 days.

(21) Appl. No.: 10/236,742

(22) Filed: Sep. 6, 2002

(65) Prior Publication Data

US 2003/0056009 A1 Mar. 20, 2003

Related U.S. Application Data

(60) Provisional application No. 60/317,670, filed on Sep. 6, 2001.

(51) Int. Cl.
*G06F 15/16* (2006.01)
(52) U.S. Cl. ........ 709/245; 709/230; 709/231; 709/234; 709/201; 709/205; 709/222
(58) Field of Classification Search .................. 709/245, 709/230, 231, 234, 201, 205, 222
See application file for complete search history.

(56) References Cited

U.S. PATENT DOCUMENTS

| | | | |
|---|---|---|---|
| 5,440,545 A * | 8/1995 | Buchholz et al. | 370/426 |
| 5,493,667 A | 2/1996 | Huck et al. | |
| 5,809,527 A | 9/1998 | Cooper et al. | |
| 5,809,543 A | 9/1998 | Byers et al. | |
| 5,963,963 A | 10/1999 | Schmuck et al. | |
| 5,970,391 A * | 10/1999 | Eaton et al. | 455/59 |
| 6,438,655 B1 | 8/2002 | Nicol et al. | |
| 6,601,143 B1 | 7/2003 | Lamparter | |
| 6,631,130 B1 * | 10/2003 | Roy et al. | 370/352 |
| 6,643,710 B1 * | 11/2003 | Thorne et al. | 709/250 |
| 6,654,811 B1 * | 11/2003 | Chaskar et al. | 709/236 |
| 6,742,045 B1 * | 5/2004 | Albert et al. | 709/238 |
| 6,771,646 B1 | 8/2004 | Sarkissian et al. | |
| 6,785,866 B1 * | 8/2004 | Lewis et al. | 715/513 |
| 6,795,866 B1 * | 9/2004 | Mankude et al. | 709/238 |
| 7,088,738 B1 * | 8/2006 | Alvarez et al. | 370/470 |
| 2002/0095512 A1 * | 7/2002 | Rana et al. | 709/232 |
| 2003/0007452 A1 * | 1/2003 | Gorti et al. | 370/229 |

OTHER PUBLICATIONS

Postel, RFC 791 of the U.S. DARPA, (1981).
RFC 815, "IP Datagram Reassembly Algorithms", by David D. Clark, 1982.

* cited by examiner

*Primary Examiner* — Lan-Dai T Truong
(74) *Attorney, Agent, or Firm* — Thomas, Kayden, Horstemeyer & Risley, LLP (57) ABSTRACT

A method for processing a datagram, including receiving an initial fragment of the datagram over a communication link and classifying in an initial classification the initial fragment as a first fragment, a middle fragment, or a last fragment of the datagram. The method further includes receiving one or more subsequent fragments over the communication link, following the initial fragment, and classifying each of the one or more subsequent fragments in respective subsequent classifications so as to find among the subsequent fragments at least one of the first fragment, the middle fragment, and the last fragment of the datagram.

Responsive to the initial and the one or more subsequent classifications, a determination is made whether the datagram is completely constituted by the initial fragment and no more than two of the subsequent fragments. The datagram is reassembled responsive to the determination.

20 Claims, 6 Drawing Sheets

EFFICIENT IP DATAGRAM REASSEMBLY

CROSS-REFERENCE TO RELATED APPLICATIONS

This application claims the benefit of U.S. Provisional Patent Application No. 60/317,670, filed Sep. 6, 2001, which is incorporated herein by reference.

FIELD OF THE INVENTION

The present invention relates generally to transmission of datagrams, and specifically to reassembling fragments of Internet Protocol (IP) datagrams.

BACKGROUND OF THE INVENTION

The Transmission Control Protocol/Internet Protocol suite is a widely-used transport protocol in digital packet networks. The Internet Protocol is described by Postel in Request For Comments (RFC) 791 of the U.S. Defense Advanced Research Projects Agency (DARPA), published in 1981, which is incorporated herein by reference. The Internet Protocol (IP) enables an IP datagram to be split into two or more IP fragments when an interface is unable to transmit the original datagram due to the latter being too large. The oversized datagram is split into separate IP fragments, each fragment being small enough to be transmitted by the interface. The process of fragmentation may occur more than once, depending on the maximum transmission unit (MTU) of each network component. For example, a datagram which is originally 1518 bytes—the maximum datagram size for networks operating according to an Ethernet protocol—may be sent to a first router having an MTU of 1000. The router divides the datagram into two IP fragments, 1000 bytes and 518 bytes, and forwards the two fragments to a second router having an MTU of 576 bytes, The second router divides the 1000 byte fragment into a 576 byte fragment and a 423 byte fragment, and thus transmits three fragments representing the original 1518 byte datagram.

The IP layer at the receiving host accumulates the fragments until enough have arrived to reconstitute the original datagram. RFC 791 describes a reassembly mechanism, and an algorithm for reassembly based on tracking arriving fragments in a vector of bits. The algorithm operates in substantially the same manner regardless of the number of fragments.

Figure 1:
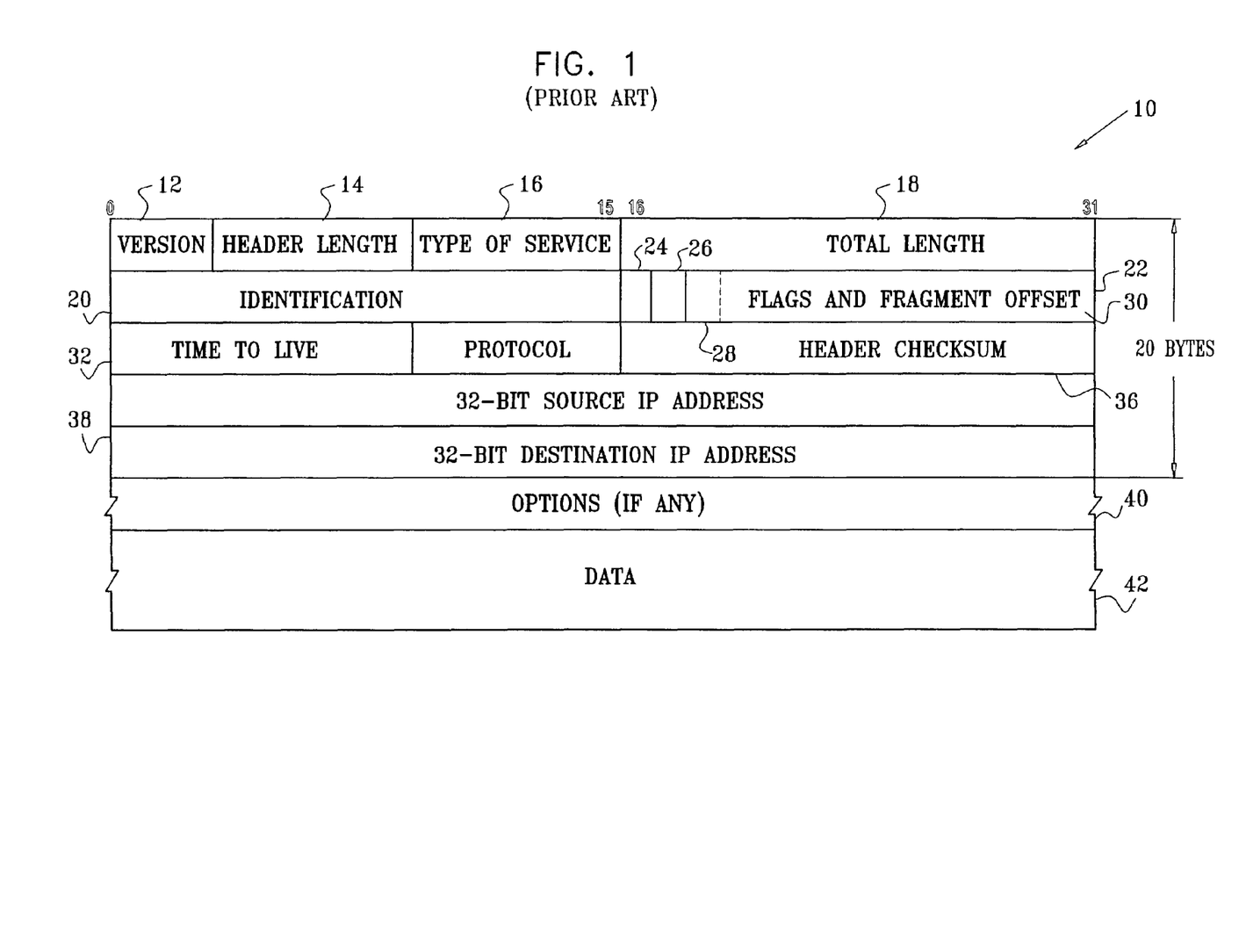
FIG. 1 is a diagram of an Internet Protocol (IP) header 10, as is known in the art.

FIG. 1 is a diagram of IP header 10, as described in RFC 791. Header 10 is prefixed to a message from a transport protocol, so forming a datagram or a fragment of a datagram. Header 10 is formed of 20 or more bytes. Fields 12, 14, and 16 respectively represent a version number, a length of header 10, and a type of service supported. A field 18 gives a total length of the datagram or fragment, in bytes, including header 10 and data. An identification field 20 is assigned by the sender as an aid to assembling datagrams.

A field 22 comprises 1-bit flags 24, 26, and 28, and a 13-bit fragment offset 30. Flag 24 must be set to zero. Flag 26 is set to 0 if the datagram may be fragmented, and is set to 1 if the datagram may not be fragmented. Flag 28 is set to 0 to indicate that this fragment is the last fragment, and is set to 1 to indicate that there are more fragments. Fragment offset 30 indicates where in the datagram the fragment belongs. It is calculated in units of 8 bytes, and is set to 0 for the first fragment. Field 22 is used by the datagram receiver to know in which order fragments are placed, and in order to correctly reassemble the fragments to the original datagram.

RFC 815, "IP Datagram Reassembly Algorithms," by David D. Clark, published in 1982, which is incorporated herein by reference, describes an alternative fragment reassembly system to that described in RFC 791. RFC 815 refers to a partially reassembled datagram which is assumed to have missing areas, termed holes. Each hole is characterized by the first byte number and a last byte number of the hole, the pair of numbers being termed a hole descriptor. A processor stores each hole descriptor, together with a pointer to the next hole, in its respective hole. The partially reassembled datagram is stored with its hole decriptors, by the processor, in a reassembly buffer. (The buffer size must be sufficient to accommodate the largest datagram transmitted by IP.) The buffer also maintains a global pointer to the first hole in the datagram.

As long as network speed was the main factor limiting receiver rates, software implementations of IP receiver logic provided adequate performance levels. However, with the advent of network speeds in the 1 Gbps and 10 Gbps range, this is no longer the case. Faster IP receiver processing is required, requiring a new approach to the original specifications in RFC 791 and/or RFC 815. Among the issues to be addressed are maximization of parallel processing, efficient information passing, and rapid classification and handling of fragments.

SUMMARY OF THE INVENTION

It is an object of some aspects of the present invention to provide apparatus and a method for efficient reassembly of datagram fragments.

In preferred embodiments of the present invention, a processor classifies an incoming fragment, which has been generated from a complete datagram, as a first, a middle, or a last fragment. The processor performs similar classifications on up to two subsequent fragments. If the first two classifications result in first and last fragment classifications, and if the two fragments form the complete datagram, the complete datagram is reassembled from the two fragments. If the first two classifications do not result in fragments forming the complete diagram, but do imply that the complete datagram may be split into three fragments, the process classifies a third fragment. If the three classifications result in the first, the middle, and the last fragment which together form the complete datagram, the complete datagram is reassembled from the three fragments. By classifying incoming fragments as first, middle, or last fragments, re-assembling the complete datagram (where it is initially divided into two or three fragments) is made significantly faster than prior art systems for re-assembling datagrams from fragments.

If the classifications indicate that the datagram has been split into more than three fragments, for example, if the first two classifications yield different middle fragments, the fragments are processed using any suitable prior art reassembly method. Thus, the prior art method is only implemented for cases of four or more fragments. Most preferably, datagrams and their fragments are generated according to a standard protocol, such as the Internet Protocol (IP), in which case the prior art reassembly method is preferably the Clark algorithm described in the Background of the Invention.

There is therefore provided, according to a preferred embodiment of the present invention, a method for processing a datagram, including:

receiving an initial fragment of the datagram over a communication link;

classifying in an initial classification the initial fragment as a first fragment, a middle fragment, or a last fragment of the datagram;

receiving one or more subsequent fragments over the communication link, following the initial fragment;

classifying each of the one or more subsequent fragments in respective subsequent classifications so as to find among the subsequent fragments at least one of the first fragment, the middle fragment, and the last fragment of the datagram;

making a determination, responsive to the initial and the one or more subsequent classifications, whether the datagram is completely constituted by the initial fragment and no more than two of the subsequent fragments; and reassembling the datagram responsive to the determination.

Preferably, each fragment includes a header, and classifying each fragment includes determining the classification of the fragment responsive to data comprised in the header.

Preferably, receiving the initial fragment and the one or more subsequent fragments includes storing ordering data from a header of each fragment in an ordering buffer and storing payload data conveyed by each fragment in a reassembly buffer, and reassembling the datagram includes reassembling the payload data from the reassembly buffer.

The method preferably also includes providing a state machine having a plurality of initial states, the state machine existing in one of the initial states responsive to receiving the initial fragment and the initial classification thereof. The state machine preferably also has a plurality of subsequent states, the state machine existing in one of the subsequent states responsive to receiving the initial fragment and the initial classification thereof, and to receiving the one or more subsequent fragments and the respective classifications of the one or more subsequent fragments.

Preferably, making the determination includes determining that the datagram is not completely constituted by the initial fragment and the no more than two of the subsequent fragments, and transferring the data fragments to a memory for subsequent reassembly responsive to the determination.

Preferably, the datagram for the method is generated according to an Internet protocol.

There is further provided, according to a preferred embodiment of the present invention, apparatus for processing a datagram, including:

a memory which receives an initial fragment and one or more subsequent fragments from a communication link and which stores the fragments; and a processor which is adapted to classify each of the fragments as a first fragment, a middle fragment, or a last fragment of the datagram and to make a determination, responsive to the classifications of each of the stored fragments, whether the datagram is completely constituted by the initial fragment and no more than two of the subsequent fragments and to reassemble the datagram responsive to the determination.

Preferably, each fragment includes a header, and classifying each fragment includes determining the classification of the fragment responsive to data comprised in the header.

Preferably, the memory includes:

an ordering buffer which is adapted to store ordering data from a header included in each fragment; and a reassembly buffer which is adapted to store payload data conveyed by each fragment; and wherein the processor is adapted to reassemble the payload data from the reassembly buffer.

The apparatus preferably also includes a state machine which is implemented from the memory and the processor, the state machine having a plurality of initial states, and existing in one of the initial states responsive to receiving the initial fragment and the initial classification thereof.

The state machine preferably has a plurality of subsequent states, the state machine existing in one of the subsequent states responsive to receiving the initial fragment and the initial classification thereof, and to receiving the one or more subsequent fragments and the respective classifications of the one or more subsequent fragments.

Preferably, making the determination includes determining that the datagram is not completely constituted by the initial fragment and the no more than two of the subsequent fragments, and the processor is adapted to transfer the data fragments within the memory for subsequent reassembly responsive to the determination.

Preferably, the datagram for the apparatus is generated according to an Internet protocol.

The present invention will be more fully understood from the following detailed description of the preferred embodiments thereof, taken together with the drawings, in which:

DETAILED DESCRIPTION OF PREFERRED EMBODIMENTS

Figure 2:
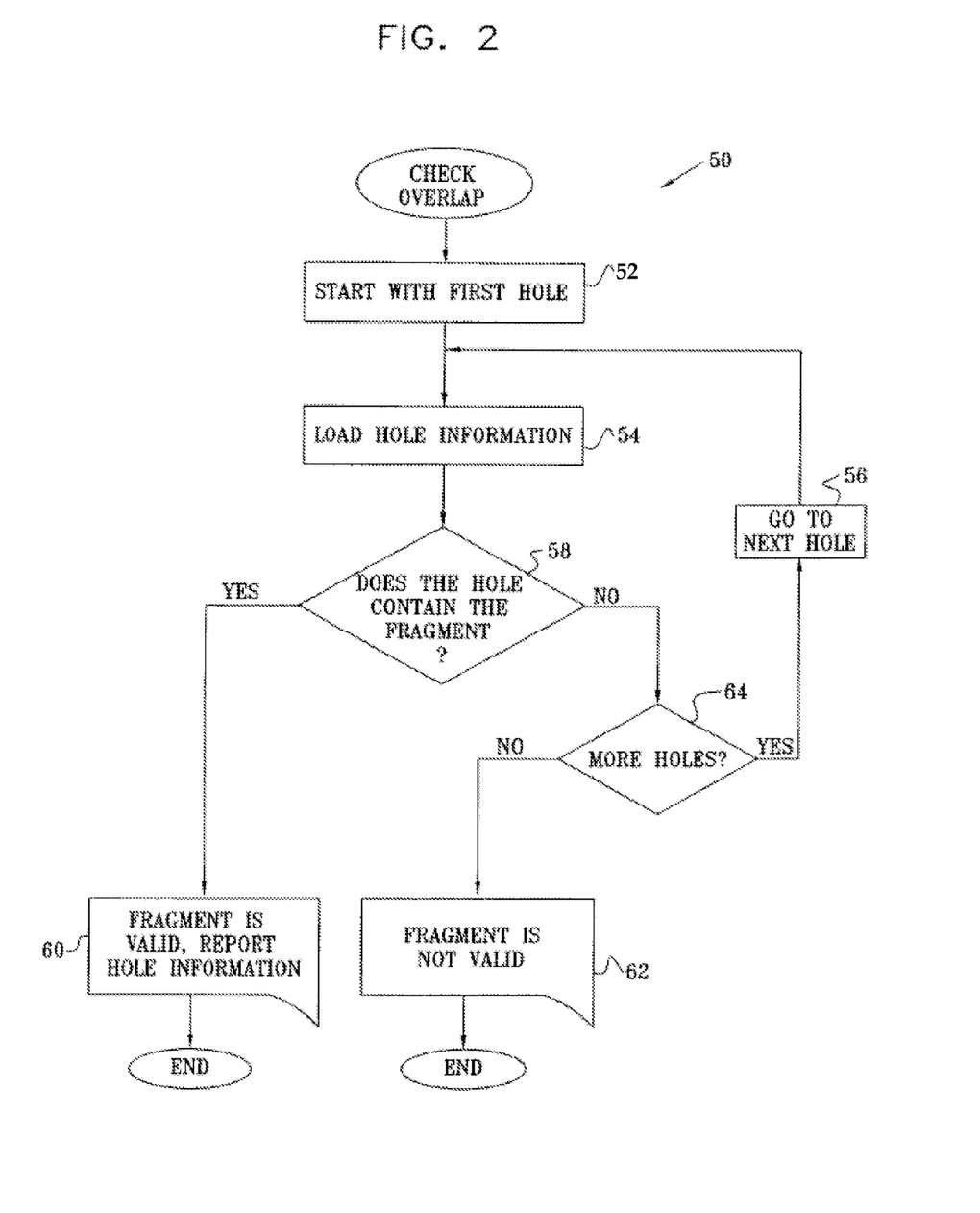
FIG. 2 is a flowchart showing steps in a first part of an algorithm for processing a fragment of an IP datagram.

FIG. 2 is a flowchart 50 showing steps in a first part of a system generally similar to that described by David D. Clark, in Request For Comments (RFC) 815. RFC 815 is described in more detail in the Background of the Invention. In flowchart 50, as each fragment is received, a fragment-start and a fragment-length are computed, in bytes, using fields 18 and 22 of IP header 10 (FIG. 1). The values of fragment-start and fragment-length are then used in flowchart 50, by comparing their values with each hole descriptor in turn. In an initial step 52, values of the first hole are read from the buffer, and in steps 54 and 58 the values are loaded and used to check if the hole contains the received fragment. If, in comparison step 58 the hole does not contain the fragment, the process of checking continues through steps 64 and 56, until all holes have been checked, in which case an invalidate step 62 determines that the fragment is not valid. If, in comparison step 58, a hole is determined to contain the fragment, in a validation step 60 the fragment is reported as valid, and the process continues to a second part 70 of FIG. 3.

Figure 3:
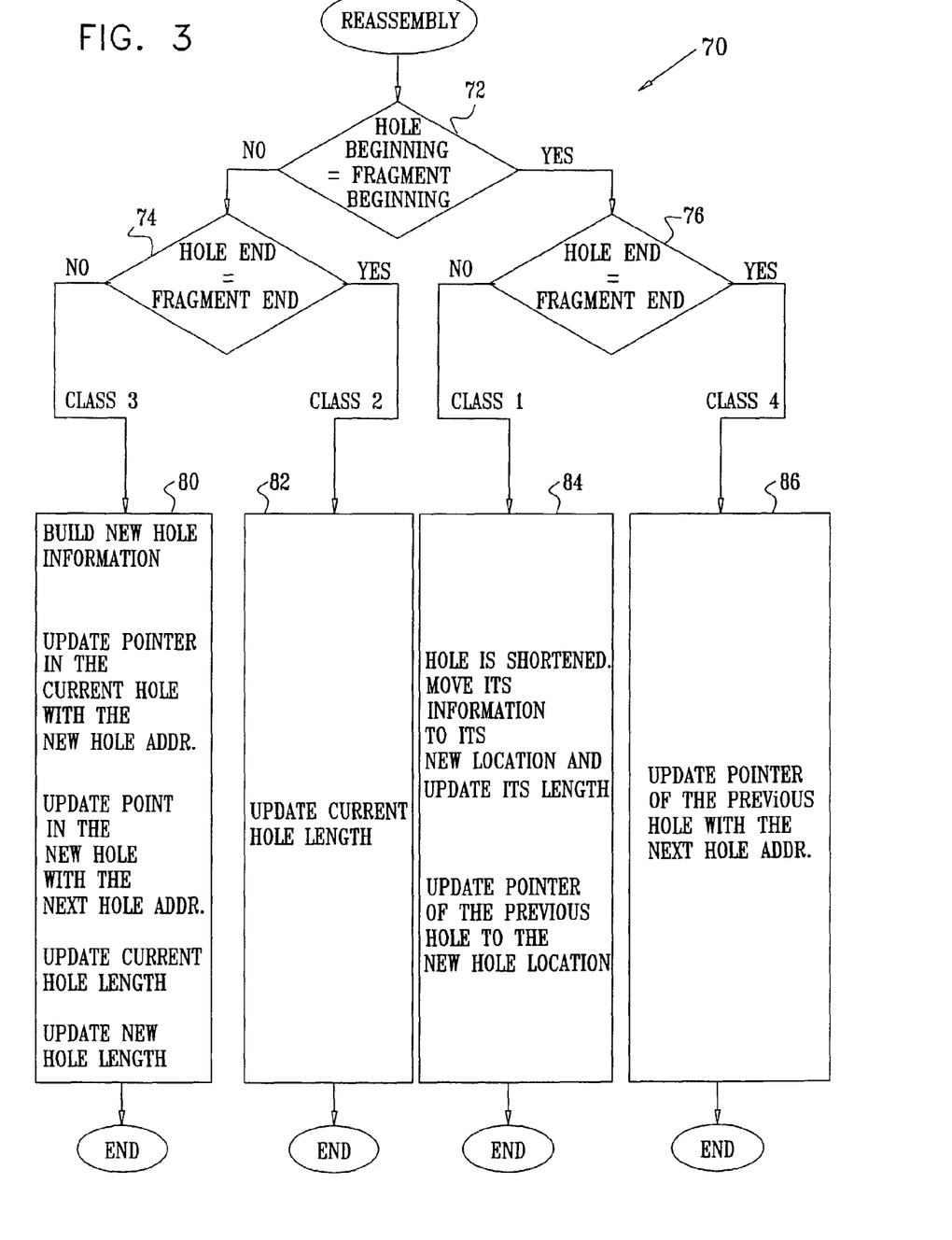
FIG. 3 is a flowchart showing steps in a second part of the algorithm of FIG. 2 for processing the fragment of the IP datagram.

FIG. 3 is a flowchart showing steps in second part 70. Once the fragment has been reported as valid in validation step 60, second part 70 classifies the fragment as one of four types. The classification is performed by comparing the hole start with the fragment start, and then by comparing the hole end with the fragment end, as shown in comparisons 72, 74, and 76. The four possible classifications of a valid fragment are:

Class 1. The fragment start and hole start are the same, and the fragment is shorter than the hole. A previous hole is partly filled by the fragment.

Class 2. The fragment end and hole end are the same, and the fragment is shorter than the hole. A previous hole is partly filled by the fragment.

Class 3. The fragment fills the "middle" of an existing hole.

Class 4. The fragment start and hole start are the same, and the fragment end and hole end are also the same, so that the hole is filled by the fragment.

After the classification has been made, hole information, such as new hole start and/or end, and hole pointers, are updated as illustrated in 80, 82, 84, and 86.

The algorithms described with reference to FIGS. 2 and 3 are executed before data from the fragment is copied to a reassembly buffer. Since the header information for holes is stored in the reassembly buffer, delays in accessing the buffer occur since the buffer size required necessitates buffer implementation as a memory external to the processor.

Figure 4:
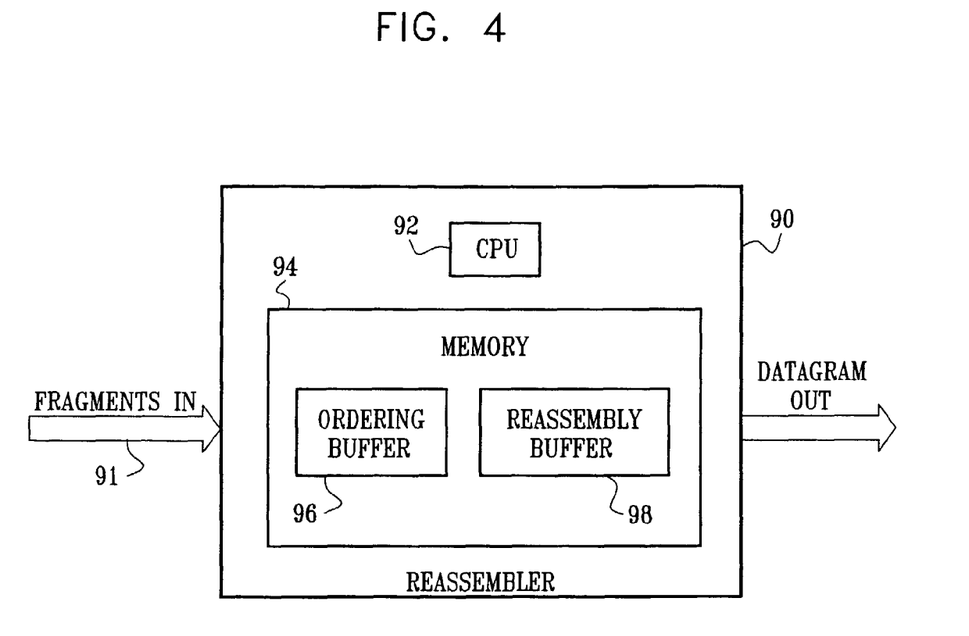
FIG. 4 is a block diagram of a fragment reassembler, according to a preferred embodiment of the present invention.

Reference is now made to FIG. 4, which is a block diagram of a fragment reassembler 90, according to a preferred embodiment of the present invention. Reassembler 90 receives packets over a communication link 91 in the form of fragments of a datagram and reassembles the fragments into a complete datagram. Data from the reassembled datagram is conveyed further, into to a receiver which contains the reassembler. Reassembler 90 comprises a central processing unit (CPU) 92, most preferably a reduced instruction set controller (RISC), coupled to a memory 94. Memory 94 stores instructions which operate CPU 92, and further comprises a fragment ordering buffer 96 and a fragment reassembly buffer 98. Ordering buffer 96 stores data concerning the order of received fragments, such as first and last sequence numbers of the fragment, the data for the buffer typically being derived from information in headers of the received fragments. Reassembly buffer 98 stores payload data conveyed by the fragments, storing the data until a CPU 92 decides how the payload data is to be disposed of. Reassembler 90 is most preferably implemented as an application specific integrated circuit (ASIC), or alternatively by any other means known in the art, such as by a combination of custom-built and/or standard devices.

As described in the Background of the Invention, an Internet Protocol (IP) datagram may be divided into two or more fragments before being transmitted from a transmitter, depending on the size of the datagram and the maximum transmission unit (MTU) of the path from the transmitter. Each fragment produced comprises identifying information in the fragment's header that enables a receiver of the fragment to identify the connection and socket of the datagram. Each fragment header also comprises sequential information of data conveyed in the fragment, such as a first and last number of bytes of the fragment data, or equivalent information. While the description hereinbelow is directed to reassembling fragments which have been generated according to the Internet Protocol, it will be appreciated that the scope of the present invention applies to any other protocol wherein datagrams are divided into fragments, and wherein the fragments comprise sequential information of data conveyed in the fragments.

Figure 5:
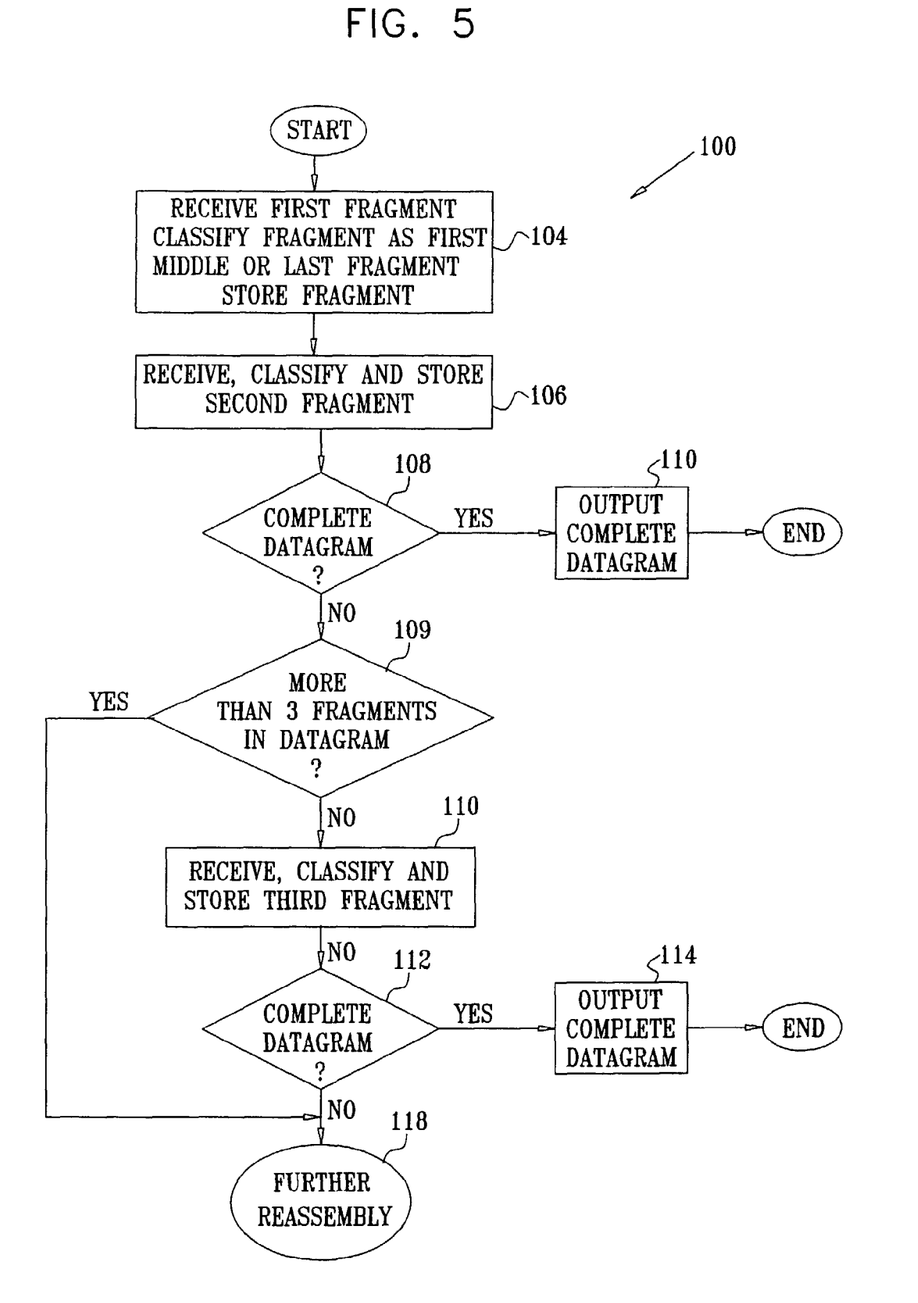
FIG. 5 is a flowchart for reassembling data fragments, according to a preferred embodiment of the present invention.
Figure 6:
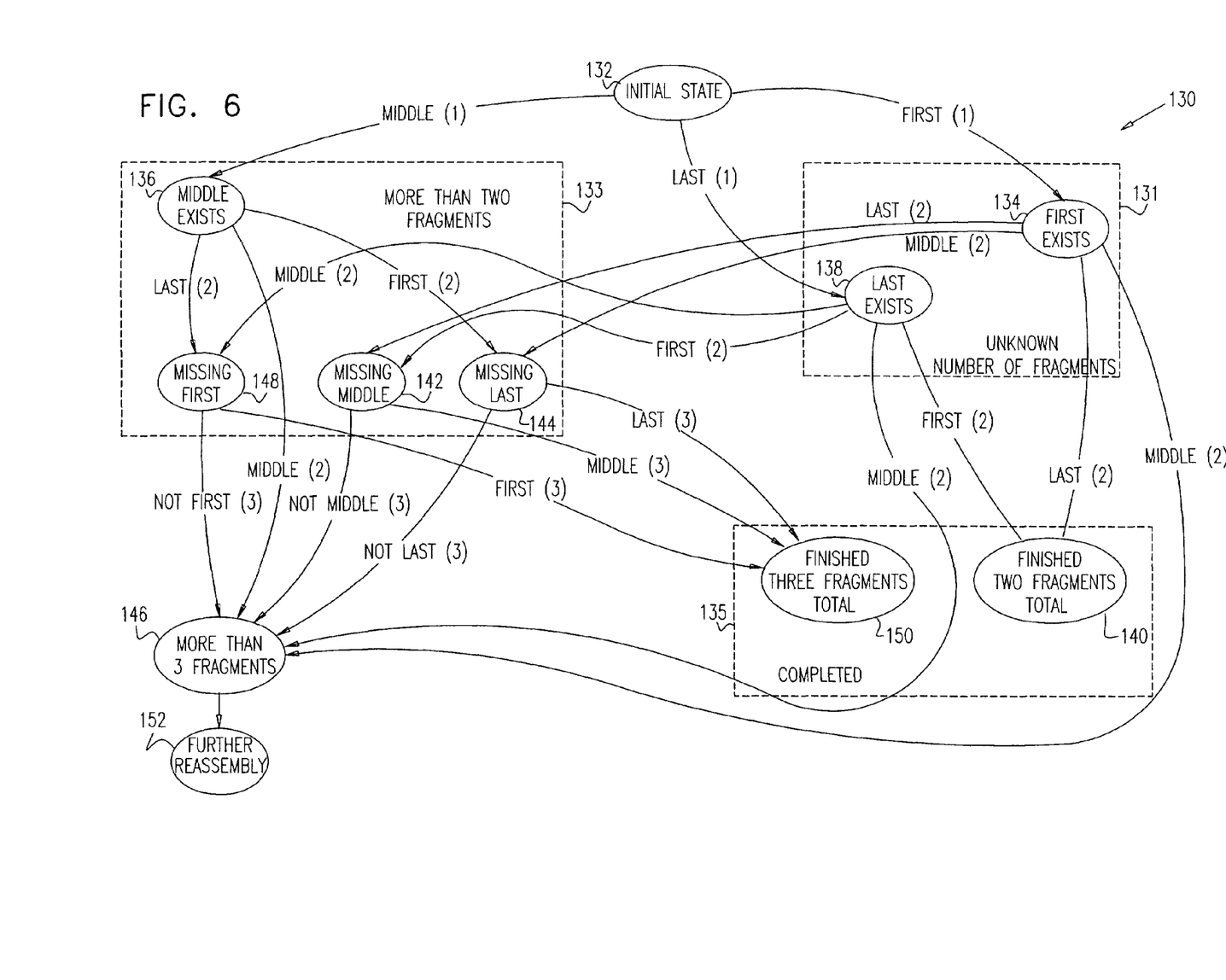
FIG. 6 is a diagram of a state machine corresponding to the flowchart of FIG. 5, according to a preferred embodiment of the present invention.

FIGS. 5 and 6 are respectively a flowchart 100 for reassembling data fragments, and a diagram of a state machine 130 corresponding to the flowchart, according to preferred embodiments of the present invention. Reassembler 90 (FIG. 4) implements flowchart 100 and state machine 130 from instructions stored in memory 94. In an initial state 132, corresponding to the start of flowchart 100, reassembler 90 waits to receive a datagram fragment. In a first receive and classification step 104, the reassembler receives a first fragment and classifies the fragment as either a first, a middle, or a last fragment. At the end of step 104, state machine 130 will be in "first (fragment) exists" state 134, "middle exists" state 136, or "last exists" state 138, according to the type of fragment received. In FIG. 6, states such as initial state 132 and state 136 are connected by arrows having descriptions of a fragment required to transfer from one state to another. For example, MIDDLE (1) connecting state 132 to state 136 indicates that the first fragment received by the reassembler (in state 132) is a middle fragment; NOT MIDDLE (3) connecting states 142 and 146 indicates that the third fragment received by the reassembler is not a required middle fragment In order to classify the first fragment, CPU 92 uses flag 28 and fragment offset field 30 (FIG. 1). Table I below shows how flag 28 and offset field classify the fragment.

TABLE I

| Flag 28 State | Fragment Offset Field 30 | Fragment Classification |
| --- | --- | --- |
| Set (1) | 0 | First part |
| Set (1) | >0 | Middle part |
| Not set (0) | >0 | Last part |

In addition to classifying the fragment, CPU 92 determines start and end values of the fragment, fragment1.start and fragment1.end respectively, in bytes, using length field 18 and offset 30. Using fragment1.start and/or fragment1.end, CPU 92 calculates connection parameters, consisting of potential values middle_start and/or middle_end that a next fragment might have. The connection parameters are stored in ordering buffer 96, and data comprised in the fragment is stored in reassembly buffer 98. The connection parameters calculated depend on the initial classification determined in step 104, and are listed in Table II below.

TABLE II

| Fragment Classification | Connection Parameter |
| --- | --- |
| First part | middle_start = fragment1.end + 1 |
| Middle part | middle_start = fragment1.start |
|  | middle_end = fragment1.end |
| Last part | middle_end = fragment1.start − 1 |

In a second step 106 a second fragment is received and CPU 92 determines start and end values of the fragment, fragment2.start and fragment2.end respectively, using length field 18 and offset 30. The fragment is classified substantially as described above for step 104 with reference to Table I.

In comparison steps 108 and 109, the two fragments are compared. Tables III, IV and V below list possible types of the second fragment and comparisons between first and second fragment parameters. The tables give results of the comparison and updates to the connection parameters, where appropriate, and a state that machine 130 is in after the comparison. Tables III, IV, and V apply when the first fragment has been classified as a first part, middle part, and last part respectively.

TABLE III

First fragment is First part

| Second Fragment | Result | State |
|---|---|---|
| Last part. middle_start = fragment2.start | First and second fragments make a complete datagram | Finished two fragments total state 140 |
| Last part. middle_start < fragment2.start | Missing middle part. middle_end = fragment2.start − 1 | Missing middle state 142 |
| Middle part. middle_start = fragment2.start | Missing last part. middle_end = fragment2.end + 1 | Missing last state 144 |
| Middle part. middle_start not eql fragment2.start | More than three fragments | More than three fragments state 146 |
| None of the above | Error | First exists state 134 |

TABLE IV

First fragment is Middle part

| Second Fragment | Result | State |
|---|---|---|
| Middle part. middle_end < fragment2.start or middle_start > fragment2.end | More than three fragments in datagram | More than three fragments state 146 |
| Last part. middle_end + 1 = fragment2.start | Missing first part. | Missing first state 148 |
| First part. middle_start = fragment2.end + 1 | Missing last part | Missing last state 144 |
| None of the above | Error | Middle exists state 136 |

TABLE V

First fragment is Last part

| Second Fragment | Result | State |
|---|---|---|
| First part. middle_end = fragment2.end | First and second fragments make a complete datagram | Finished two fragments total state 140 |
| First part. middle_end < fragment2.end | Missing middle part. middle_start = fragment2.end + 1 | Missing middle state 142 |
| Middle part. middle_end = fragment2.end | Missing first part. middle_start = fragment2.start | Missing first state 148 |
| Middle part. middle_end > fragment2.end | More than three fragments | More than three fragments state 146 |
| None of the above | Error | Middle exists state 134 |

If the first and second fragments make a complete datagram, corresponding to the first rows of Tables III and V, comparison 108 is positive. In this case process 100 completes in complete datagram step 110, corresponding to state machine 130 moving to "Finished two fragments total" state 140. When comparison 108 is negative, comparison 109 is invoked, to check if there are more than three fragments in the datagram, corresponding to the fourth rows of Tables III and V and the first row of Table IV.

If comparison 109 is positive, process 100 finishes with an invoke Clark algorithm step 118, corresponding to machine 130 moving to state 146. If comparison 109 is negative, process 100 continues to a receive third fragment step 110, corresponding to state machine 130 being in states 142, 144, or 148. On receipt of the third fragment CPU 92 determines start and end values of the fragment, fragment3.start and fragment3.end respectively, and in a comparison step 112 the CPU compares these with parameters derived from the two fragments already received. Details of the comparisons are given in Tables VI, VII, and VIII below, corresponding to state machine 130 being in states 148, 142, and 144 respectively. The tables also show the final state of machine 130.

TABLE VI

Missing first fragment state 148

| Third Fragment | Result | State |
|---|---|---|
| First part. middle_start = fragment3.end | Three fragments make a complete datagram | Finished three fragments total state 150 |
| First part. middle_start > fragment3.end | More than 3 fragments. | More than three fragments state 146 |
| Middle part. middle_start ≧ fragment3.end | More than 3 fragments. | More than three fragments state 146 |
| None of the above | Error | Missing first fragment state 148 |

TABLE VII

Missing middle fragment state 142

| Third Fragment | Result | State |
|---|---|---|
| Middle part. middle_start = fragment3.start and middle_end = fragment3.end | Three fragments make a complete datagram | Finished three fragments total state 150 |
| Middle part. middle_start < fragment3.start | More than 3 fragments. | More than three fragments state 146 |
| Middle part. middle_end > fragment3.end | More than 3 fragments. | More than three fragments state 146 |
| None of the above | Error | Missing first fragment state 142 |

TABLE VIII

Missing last fragment state 144

| Third Fragment | Result | State |
|---|---|---|
| Last part. middle_end = fragment3.start − 1 | Three fragments make a complete datagram | Finished three fragments total state 150 |
| Last part. middle_end < fragment3.start − 1 | More than 3 fragments. | More than three fragments state 146 |
| Middle part. middle_end ≦ fragment3.end | More than 3 fragments. | More than three fragments state 146 |
| None of the above | Error | Missing last fragment state 144 |

If in comparison 112 it is found that the three received fragments form a complete datagram, process 100 finishes at complete datagram step 114, corresponding to the first rows of Tables VI, VII, and VIII, and to state machine 130 being in state 150. If comparison 112 is false, process 100 concludes by transferring to a reassembly method suited to more than three fragments, such as the Clark algorithm. This corresponds to state machine 130 moving from state 146 to a further reassembly state 152, and to the already received fragments preferably being transferred to a different region of memory 94. Alternatively, the reassembly method may use links, stored in memory 94, to the already received fragments.

Inspection of FIG. 6 shows that states within a rectangle 131 correspond to states where it is known that there are an unknown number of fragments; states within a rectangle 133 correspond to states where it is known that there are more than two fragments; and states within a rectangle 135 correspond to completed states where it is known that there are an two or three fragments.

It will be appreciated that state machine 130, by classifying datagram fragments as first, middle, or last fragments, is able to re-assemble datagrams which have been fragmented into up to three fragments extremely efficiently.

Data networks which operate according to an Ethernet protocol are able to transmit frames having a maximum length of 1518 bytes. A maximum transmission unit (MTU) for each component of the network, such as a router which conveys frames over the network, must be at least 576 bytes; typically, a number of routers within the network have the same values of MTU, such as 576 bytes. Thus, an Ethernet frame of 1518 bytes would be fragmented into three fragments if passing through one or more routers having MTUs of 576 bytes. State machine 130 will efficiently reassemble such fragments, without having to transfer to state 152, i.e., without having to implement a further reassembly algorithm.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing a datagram, comprising:
in a single chip comprising an on-chip processor and an on-chip memory:
receiving, by said single chip, an initial fragment of the datagram over a communication link;
classifying, utilizing said on-chip processor, the initial fragment as one of the following: a first fragment, a middle fragment, and a last fragment of the datagram;
receiving, by said single chip, a plurality of subsequent fragments over the communication link, following the initial fragment;
classifying, utilizing said on-chip processor, the plurality of subsequent fragments to find among the plurality of subsequent fragments two of the following: the first fragment, the middle fragment, and the last fragment of the datagram;
determining, utilizing said on-chip processor, whether the datagram is completely constituted by the initial fragment and no more than two of the plurality of subsequent fragments; and
reassembling, utilizing said on-chip processor, the datagram based on the determination.

2. The method according to claim 1, wherein each fragment comprises a header, and wherein classifying each fragment comprises determining the classification of the fragment responsive to data comprised in the header.

3. The method according to claim 1, wherein said receiving of the initial fragment and the plurality of subsequent fragments comprises storing ordering data from a header of each fragment in an ordering buffer in said on-chip memory, and storing payload data conveyed by each fragment in a reassembly buffer in said on-chip memory, and wherein reassembling the datagram comprises reassembling the payload data from the reassembly buffer.

4. The method according to claim 1, comprising providing, utilizing said on-chip processor and said on-chip memory, a state machine which comprises a plurality of initial states, the state machine existing in one of the initial states responsive to said receiving of the initial fragment.

5. The method according to claim 4, wherein the state machine comprises a plurality of subsequent states, the state machine existing in one of the subsequent states responsive to said receiving of the initial fragment and to said receiving of the plurality of subsequent fragments.

6. The method according to claim 1, wherein the determining comprises determining that the datagram is not completely constituted by the initial fragment and the at least two subsequent fragments, and transferring the initial fragment and the at least two subsequent fragments to said on-chip memory for subsequent reassembly, responsive to the determination.

7. The method according to claim 1, wherein the datagram is generated according to an Internet protocol.

8. An apparatus for processing a datagram, comprising:
a single chip comprising an on-chip processor and an on-chip memory, wherein:
said on-chip memory is adapted to receive an initial fragment and at least two subsequent fragments of a datagram and store the received initial fragment and the at least two subsequent fragments;
said on-chip processor is adapted to classify the initial fragment and the at least two subsequent fragments as one of a first fragment, a middle fragment, and a last fragment of the datagram; and
said on-chip processor is adapted to make a determination, responsive to the classification of each of the stored fragments, whether the datagram is completely constituted by the initial fragment and no more than two of the at least two subsequent fragments, and to reassemble the datagram based on the determination.

9. The apparatus according to claim 8, wherein each of the initial fragment and the at least two subsequent fragments comprises a header, and wherein classifying each of the initial fragment and the at least two subsequent fragments comprises determining the classification of the initial fragment and the at least two subsequent fragments based on data comprised in the header.

10. The apparatus according to claim 8, wherein the on-chip memory comprises:
an ordering buffer which is adapted to store ordering data from a fragment header; and
a reassembly buffer which is adapted to store payload data conveyed by each fragment, and wherein the on-chip processor is adapted to reassemble the payload data from the reassembly buffer.

11. The apparatus according to claim 8, wherein said single chip comprises a state machine which is implemented from the on-chip memory and the on-chip processor, the state machine comprising a plurality of initial states, and existing in one of the initial states responsive to receiving the initial fragment.

12. The apparatus according to claim 11, wherein the state machine comprises a plurality of subsequent states, the state machine existing in one of the plurality of subsequent states responsive to receiving the initial fragment and at least two subsequent fragments.

13. The apparatus according to claim 8, wherein making the determination comprises said on-chip processor determining that the datagram is not completely constituted by the initial fragment and the at least two subsequent fragments, and wherein the on-chip processor is adapted to transfer the initial fragment and the at least two subsequent fragments within the on-chip memory for subsequent reassembly responsive to the determination.

14. The apparatus according to claim 8, wherein the datagram is generated according to an Internet protocol.

15. A system for processing data, the system comprising:
a single chip comprising at least one on-chip processor and an on-chip memory, wherein:
the at least one on-chip processor enables classifying of a received initial fragment of a datagram as one of the following: a first fragment, a middle fragments, and a last fragment of the datagram;
the at least one on-chip processor enables classifying of a plurality of received subsequent fragments of the datagram as at least two of the following: a first fragment, a middle fragment, and a last fragment of the datagram; and
the at least one on-chip processor enables determination of whether the datagram is completely constituted by the initial fragment and no more than two of the plurality of subsequent fragments and reassembling the datagram based on the determination.

16. The system according to claim 15, wherein the at least one on-chip processor enables storing ordering data from a header of each fragment in an ordering buffer in said on-chip memory, and storing payload data conveyed by each fragment in a reassembly buffer in said on-chip memory, and wherein reassembling the datagram comprises reassembling the payload data from the reassembly buffer.

17. The system according to claim 15, wherein the received initial fragment comprises at least one of the following: a first fragment, a middle fragment, and a last fragment.

18. A method for processing data, the method comprising:
in a single chip comprising an on-chip processor and an on-chip memory:
classifying, utilizing said on-chip processor, a received initial fragment of a datagram as one of the following: a first fragment, a middle fragments, and a last fragment of the datagram;
classifying, utilizing said on-chip processor, a plurality of received subsequent fragments of the datagram as at least two of the following: a first fragment, a middle fragment, and a last fragment of the datagram;
determining, utilizing said on-chip processor, whether the datagram is completely constituted by the initial fragment and no more than two of the plurality of subsequent fragments; and
reassembling, utilizing said on-chip processor, the datagram based on the determination.

19. The method according to claim 18, wherein each fragment comprises a header, and wherein classifying each fragment comprises determining the classification of the fragment responsive to data comprised in the header.

20. The method according to claim 18, wherein the received initial fragment comprises at least one of the following: a first fragment, a middle fragment, and a last fragment.

* * * * *